Patented Mar. 23, 1926.

1,577,573

UNITED STATES PATENT OFFICE.

WILLIAM ADOLF FRAYMOUTH, OF BHOPAL, CENTRAL INDIA, ASSIGNOR TO THE BHOPAL PRODUCE TRUST LIMITED, OF BHOPAL, CENTRAL INDIA, A COMPANY INCORPORATED IN BHOPAL STATE.

PROCESS OF RECOVERING OXALATE FROM THE TREE BARKS.

No Drawing. Application filed November 30, 1923. Serial No. 677,888.

*To all whom it may concern:*

Be it known that I, WILLIAM ADOLF FRAYMOUTH, a subject of His Majesty King George V, and resident of Bhopal, Bhopal State, Central India, have invented certain new and useful Improvements in Processes of Recovering Oxalate from the Tree Barks, of which the following is a specification.

My invention relates to the recovery of calcium oxalate and other oxalates from trees or plants.

In my Patent 1,525,806, Feb. 10, 1925, I have described certain methods of extracting the crystalline calcium oxalate from the Terminalia Arjuna or like trees. The present invention has for its object the provision of a process whereby froth flotation may be applied for the purpose of extracting calcium oxalate and other oxalates from the Terminalia Arjuna or other trees or plants found to contain the same, which other trees or plants are hereinafter referred to as "like trees".

In carrying out this invention, I first take from the tree the bark from which the crystalline calcium oxalate is to be extracted. This bark may be live bark, or the dead scabs or flakes from the bark, or the bark or root bark from fallen trees. This bark is crushed or ground sufficiently finely to liberate as far as possible the contained crystals of calcium oxalate from the remainder of the bark. The crushing or grinding may be performed in either a dry or a wet state. The next step is then, either before or after the extraction of the solubles, to thoroughly wet, soak and make sodden in water at any suitable temperature the finely ground bark and oxalate. This is then mixed with air, gas or steam, either with or without the addition of oils, chemicals etc. as froth producers or stabilizers in any suitable froth flotation machine to cause the required frothing. The froth carrying the oxalate is then floated off, any convenient means being used, such as a launder, down which the froth, or oxalate as the froth breaks, may be carried by a stream of water or other means to settling tanks, filters or other suitable known apparatus from which the oxalate may be recovered.

In practice it has been found that when the finely ground bark is wetted with water and mixed therewith, the air occluded by the particles causes a froth in which the finest particles of oxalate rise to the surface. This froth carries particles of bark which have not become thoroughly wetted, and tannin matter is often mixed with it. As it will always be difficult to get anything like a clean oxalate product from this impure froth, I prefer to mix the pulp so thoroughly that the oxalate sinks or is mixed in. It is possible, however, to suck off or remove this froth with some oxalate. This occurs generally in a solution which is acid in character.

After soaking, the first strong tannin liquor is removed by decantation or other known method; then, when the solution mixed with the pulp becomes weak in tannin and other solubles, if the mixture be boiled, the rising bubbles of steam carry much fine oxalate to the surface in a froth. The weaker the solution the cleaner the oxalate product. This can be repeated with several lots of water, each one of which when boiled throwing up a froth containing oxalate. These froths are not stable, but much clean oxalate could be separated in a flotation machine. The cost of boiling would, however, be heavy. Tannin or solubles if contained in the bark or tree may be extracted therefrom to a desired amount either before or after the grinding of, or fine division of, the substance. The pulp after extraction of the solubles may be dried, ground in a mill or otherwise further reduced, wetted again and then subjected to froth flotation to recover the oxalates therefrom.

I, however, prefer the following process:—

From the finely ground bark the soluble matter is wholly or partly removed as far as is advisable. With regard to the removal of solubles the extraction should be carried to a point where residual tannin and/or soluble matter will not interfere with the subsequent froth flotation. In certain cases, however, a trace of tannin and/or soluble non-tans in the liquid mixture may possibly help in producing or stabilizing the froth. The bark particles have by this time become thoroughly sodden. If such particles have swollen to become larger than the particles of oxalate, the pulp may be thickened and then ground in a wet mill, preferably to a grade that will pass a 150 mesh screen. When this with excess of water is agitated with air or gas, a froth rises carrying clean oxalate. On the addition, either before or during agitation, of just enough alkali to bring about an alkaline reaction with an indicator, the froth often becomes more stable, and the further addition of very small quantities of frothing agents, such as, for example, crude distillate from wood or charcoal, creosote, pine oil, or other known flotation oils or the like, may bring about a still more stable froth which will allow practically all the oxalate to be recovered.

For example, using bark powdered to pass a 100 mesh sieve, I have separated calcium oxalate from the exhausted powdered bark of the Terminalia Arjuna by the following method. After removal of nearly all the tannin and soluble matter the scrubber liquors from the washing of charcoal gas to be used in a gas engine (which liquors contain creosote and other distillates from charcoal) are added to the bark pulp and thereto are added from ½ to 2 pounds of soda ash per ton of dry bark in about ten tons of water, and thereafter, or during subsequent froth flotation, the gradual addition of from ½ to 3 lbs. of tilseed oil per ton of bark produces a satisfactory froth from which calcium oxalate may be recovered.

These additions are not essential, nor are they the only suitable ones, and naturally they and the quantities required will depend upon the character and quantity of the bark and the oxalates present.

On the other hand, I have found it possible to separate out the calcium oxalates without the addition of any further froth forming agents or stabilizers simply by increasing the agitation and the amount of aeration of the pulp. Apparently this is possible even with very small traces of tannin in the pulp, and perhaps without any tannin or solubles in the mixture, if the agitation and aeration is sufficiently vigorous.

It appears in fact possible after very fine grinding so that the bark constituents can pass wet through a sieve having a mesh of 100 to 200 openings per linear inch and given intensive aeration in water to raise a heavy froth without the intentional addition of any frothing agents at all. Possibly, however, this has been due to the very small traces of petroleum or creosote carried forward by the exhaust gases used for agitating the bark constituents when extracting the tannin therefrom and that these very small traces, which it would appear cannot be more than from the fraction of an ounce to a few ounces per ton of bark treated, are effective in assisting in raising a froth.

At the stage when the soluble matter has as far as is advisable been removed, the pulp may be dried, ground in a dry mill, or otherwise further reduced, wetted again and then subjected to the froth flotation process described above.

The exact action of the alkali is not clear but its function may be to form a soap with the ligneous or resinous matter of the bark particles, or it may react with the residual traces of tannin, or, if a carbonate, it may etch the surfaces of the oxalate crystals and so cause them to attach themselves to the bubbles of gas. The alkali probably forms soaps with the flotation oils if used. The addition of an alkali does not appear in all cases to be necessary.

A temperature of about 30° C. seems to be suitable, though my process is not confined to such a temperature.

The process has been described with reference to the treatment of the bark, but any other part of the tree or plant found to contain oxalate may be treated in the same way as far as practicable, such other part being considered as included in the term "bark" whenever it occurs in the following claims.

Having now particularly described and ascertained the nature of my said invention and the manner in which the same is to be performed, I declare that what I claim is:—

1. The process of obtaining oxalates from the Terminalia Arjuna, or like trees, which consist in crushing or grinding the bark so as to liberate contained oxalate crystals, mixing it with sufficient water, and then agitating the mixture with a gaseous fluid to form a froth carrying the oxalate, and finally recovering the oxalate therefrom.

2. The process as specified in claim 1, in which prior to the agitation, the finely crushed or ground bark is thoroughly soaked or sodden in water.

3. The process as specified in claim 1, in which after crushing or grinding the bark, the solubles therein contained are extracted.

4. The process as specified in claim 1, in which froth producers are added to the said mixture.

5. The process of obtaining oxalates from the Terminalia Arjuna, or like trees, which consists in crushing or grinding the bark sufficiently fine to liberate as far as possible the contained oxalate crystals, soaking the bark in water, removing such water with the strong tannin and other solubles therein contained, mixing the remaining pulp with water, boiling the same and finally removing the froth to extract the oxalate therefrom.

6. The process as specified in claim 5, in which the dilution of the pulp, the boiling and removing the froth is repeated until the oxalate is removed.

7. The process of obtaining oxalates from the Terminalia Arjuna, or like trees, as specified in claim 1, in which after the crushing or grinding of the bark, the pulp is thickened and reground in a wet mill, water added and the mixture agitated to form a froth.

8. The process of extracting calcium oxalate from the bark of the Terminalia Arjuna, or like trees, which consists in extracting soluble matter with water before crushing the bark sufficiently finely to liberate contained crystals of calcium oxalate, carrying the extraction to a point where residual tannin will not interfere with subsequent froth flotation, adding sufficient alkali to neutralize, and finally subjecting to froth flotation.

9. The process of extracting calcium oxalate from the bark of the Terminalia Arjuna, or like trees which consists in extracting soluble matter with water after crushing the bark sufficiently finely to liberate contained crystals of calcium oxalate, carrying the extraction to a point where residual tannin will not interfere with subsequent froth flotation, adding sufficient alkali to neutralize, and finally subjecting to froth flotation.

10. The process of obtaining oxalates from the Terminalia Arjuna, or like trees, wherein, after removal as far as possible of the soluble matter from the bark, the pulp is dried, further reduced, wetted again and then subjected to a froth flotation process.

11. The process as specified in claim 1, in which sufficient alkali is added to the said mixture to bring about an alkaline reaction.

12. The process as specified in claim 1, in which crude distillates from wood are added to the said mixture.

13. The process as specified in claim 1, in which creosote is added to the said mixture.

14. The process as specified in claim 1, in which a flotation oil is added to the said mixture.

15. The process as specified in claim 1, in which the froth is formed by intensive aeration in water of a bark constituent ground to pass wet through a mesh of 100 to 200 openings per linear inch.

16. The process as specified in claim 1, in which the froth is formed by intensive aeration in water of a bark constituent ground to pass wet through a mesh of 100 to 200 openings per linear inch with the addition of a small quantity of an agent to assist in raising the froth.

In testimony whereof I hereto affix my signature this 25th day of October 1923.

WILLIAM ADOLF FRAYMOUTH.